Figure 2:
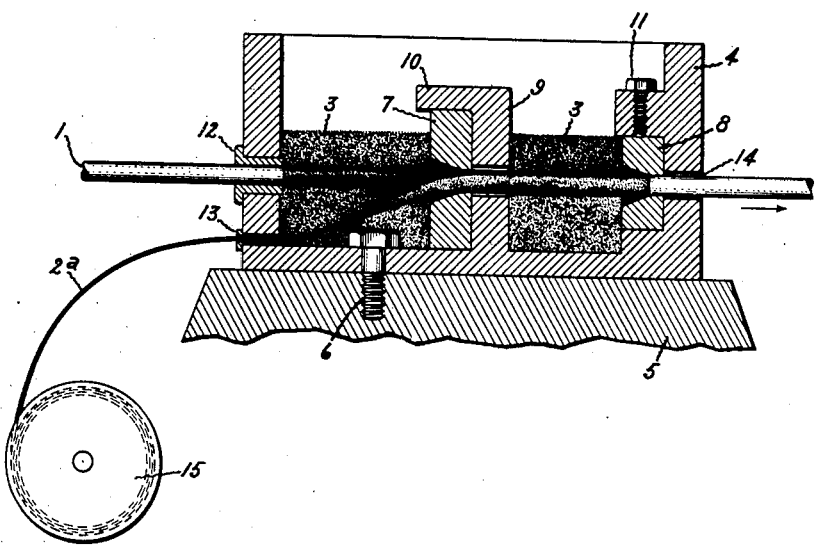

Feb. 10, 1925.

J. M. WEED

ELECTRODE AND METHOD OF MAKING THE SAME

Filed May 26, 1920

Inventor:
James M. Weed,
by Albert G. Davis
His Attorney.

Patented Feb. 10, 1925.

1,525,840

UNITED STATES PATENT OFFICE.

JAMES M. WEED, OF SCHENECTADY, NEW YORK, ASSIGNOR TO GENERAL ELECTRIC COMPANY, A CORPORATION OF NEW YORK.

ELECTRODE AND METHOD OF MAKING THE SAME.

Application filed May 26, 1920. Serial No. 384,339.

*To all whom it may concern:*

Be it known that I, JAMES M. WEED, a citizen of the United States, residing at Schenectady, county of Schenectady, State of New York, have invented certain new and useful Improvements in Electrodes and Methods of Making the Same, of which the following is a specification.

My invention relates to a new type of electrode, particularly adapted for metallic arc welding. My invention also relates to a method of making electrodes especially adapted for arc welding electrodes of my new type, but adapted for making electrodes for other purposes, for example, arc lamp electrodes.

It is frequently necessary or desirable to incorporate with arc welding electrodes a welding flux or arc sustaining material for assisting in the operation of welding. Such flux is especially desirable in the case of arc welding with alternating current. My invention is concerned with electrodes in which such welding flux is employed.

An object of my invention is to provide an electrode of the class described in which the flux shall be enclosed within the body of the electrode, whereby the electrode is clean to handle and the flux protected from abrasion or flaking, thus producing an electrode which is rugged in construction and which may be coiled, shipped and handled with no more care than is required with common bare electrode wire.

A further object of my invention is to provide an electrode of the class described in which no material undesirable from the standpoint of a good welding flux is required as a binder, as it may be when a welding flux is cemented to the outer surface of the electrode.

A further object of my invention is to provide an electrode of the class described, which may be simply and cheaply manufactured, and which shall lend itself to quantity production, while still maintaining a high degree of uniformity in the manufactured product.

A further object of my invention is to provide an electrode of the class described, which shall be provided with a bare good conducting surface whereby it may be clamped at any point in an ordinary electrode holder or used in automatic arc welding machines which comprise means for conducting the welding current to the surface of the moving electrode.

A further object of my invention is to provide a convenient method of introducing two kinds of metal into the electrode for modifying the composition and characteristics of the material deposited in the weld.

A further object of my invention is to provide a method of manufacture which shall require no radical development in the way of apparatus for practicing the method and which shall insure uniform production with no more skill on the part of the operator than is required in ordinary wire drawing operations, and a method which shall be not only simple as to the acts performed and inexpensive as to the apparatus required, but which shall lend itself to quantity production.

My invention will be better understood from the following description taken in connection with the accompanying drawing and its scope will be pointed out in the appended claims.

Figure 3:
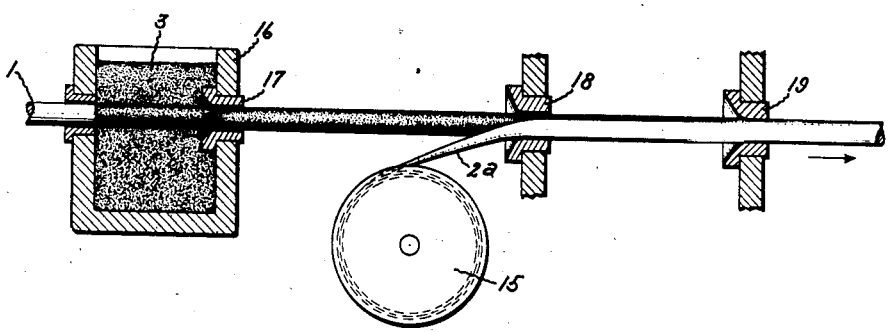
Figure 1:
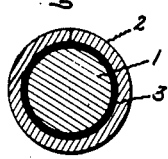

Referring to the accompanying drawing, Fig. 1 shows a cross-section of my improved electrode; Fig. 2 represents the preferred method of manufacturing my electrode; and Fig. 3 represents an alternative method of manufacture.

Referring to Fig. 1, it will be seen that my improved arc welding electrode comprises a central metallic core 1, a bare metallic sheath or sleeve 2, and a layer of flux 3 enclosed between the sheath 2 and the core 1.

My invention, as far as the electrode itself is concerned, is not limited to any particular method of manufacture, but I prefer to make the electrode by forming the sheath 2 out of a ribbon, or strap, folding or rolling said strap about the core 1 with a thin layer of flux or arc sustaining material concentric between the inner core and outer sheath.

Referring to Fig. 2, which illustrates the preferred method of manufacturing my electrode, 4 represents a box, which will preferably be constructed of metal, held upon the support 5 by any suitable means, shown, for example, as a bolt 6. Dies 7 and 8, through which the electrode material is to be drawn, are mounted in the box 4. Die 7 is held in position by a member 9 integral with or rigidly secured to the box 4, provided with an overhanging portion 10 beneath which the die 7 is slipped. The die 8 is clamped in place between shoulders on the end of box 4 by means of a set screw 11. This arrangement enables the dies to be readily removed and other dies substituted. It will be understood, however, that my invention is not limited to any particular construction of die supporting box, nor to the particular form of dies shown. One end of the box is provided with bushings 12 and 13 through which the electrode core 1 and the strap 2ª for the sheath 2 respectively pass into the box. The core 1 and ribbon or strap 2ª may be drawn from any convenient supply of material, the strap 2ª being indicated in Fig. 2 as drawn from a reel 15. The core and strap pass together through the die 7, an opening in the member 9, the die 8 and an opening 14 in the other end of box 1. They are drawn through the box, in the direction indicated by the arrow, by any suitable wire drawing mechanism and the die box is preferably arranged to pivot about the bolt 6 so that it can readily adjust itself to a position in which the openings therein will be in line with the direction in which the wire is being drawn.

As shown in Fig. 2, the box 4 contains a quantity of the flux 3, which may be in the form of a thin mortar or paste, and which submerges the dies 7 and 8. As the core 1 and the strap 2ª pass through die 7, the strap is folded about the core, forming an open sheath, the space between the core and the sheath being automatically filled with the flux. The combined core and sheath then pass through die 8 which brings the edges of the open sheath together. Preferably the parts are constructed and arranged so that the open sheath is slightly reduced in diameter as it is drawn over the core 1. By this operation a uniform layer of flux of definite thickness is included between the sheath and core.

I prefer to use die 7 for preshaping the strap 2ª into an open sheath before it comes to the finishing die 8 to reduce the work on die 8. This shaping process is hard on the die, since the edges of the strap, in being folded, exert great local pressures and produce friction which is greater the smaller the die. If only the finishing die were used, this would result in abrading the edges of the strap and burring the die. This produces a rough surface on the outside of the finished electrode wire, and causes the sheath to break where it is passing through the die. This difficulty does not occur with the preshaping die 7, on account of the larger size of this die, and no difficulty occurs with the finishing die when the strap or sheath comes to it in the open cylindrical form given to it by the preshaping die.

An important feature of my invention resides in the fact that advantage is taken of the lubricating properties of the welding flux by submerging the dies in the welding flux during the operation of drawing the sheath over the core.

A welding flux which I have found suitable for manufacturing my electrode according to my preferred method is disclosed in the Letters Patent of J. C. Armor, No. 1,374,711, dated April 12, 1921, and assigned to the assignee of this application. This flux is not only well adapted to sustain a low voltage alternating arc, but, in addition, acts as a very satisfactory die lubricant when finely ground and made into paste form.

To adapt the apparatus of Fig. 2 for drawing electrodes of different sizes, it is merely necessary to change the dies 7 and 8 and the bushings 12 and 13.

Any convenient method may be adopted for drawing the electrode materials through the dies as heretofore set forth. The finished electrode wire, as produced, may be coiled, as on the reel of an ordinary wire drawing machine, or it may be cut into straight pieces of suitable length for use in welding, and tied up in bundles of convenient size for handling.

When water or other solvent, which is undersirable in the finished electrode, is used in forming the flux paste, this may be eliminated by baking the finished electrode wire in an oven at temperatures sufficiently high to drive off the vapor which may escape through the seam or crevice in the sheath or at the ends of the electrodes where they are cut into short lengths.

While I have particularly described the process represented in Fig. 2 in connection with the manufacture of electrodes for arc welding, the method is not limited to such electrodes but is of broader applicability, being adapted, for example, to the manufacture of electrodes for arc lamps. Since the strap 2ª which becomes the sleeve 2 furnishes a convenient means for pulling the electrode through the dies, the core 1 need not be mechanically strong. Even though the core 1 be broken into short lengths during the drawing operation, these lengths will be confined within the conducting sleeve and the fact that the core 1 is thus broken will have no deleterious effect on the operation of an arc lamp. The material 3 may be used merely to assist in the placing of the sheath upon the core and in securing the core in place, or this material may be composed or have embodied therein a substance which it is desired to introduce into the arc. The core 1 might, for example, be composed of titanium carbide and the material 3 might, for example, be the red oxide of iron which is soapy in character, and, therefore, a suitable lubricant for the dies 7 and 8. This oxide will be converted in the arc to magnetite which has a beneficial effect on the arc flame.

It is apparent that some features of my invention may be used without others. In manufacturing electrodes for some purposes the core 1 may be omitted, if desired, and the material to be enclosed in the sheath may be assisted in entering the tube by means of pressure exerted in any convenient manner upon such material.

Fig. 3 represents an alternative method by which my electrode may be made and this alternative method may be preferable when the flux in paste form does not possess lubricating properties in sufficient degree to enable the process represented in Fig. 2 to be carried out without providing additional lubricant for the dies. In this figure, the electrode core 1 is represented as passing through a receptacle 16 containing the flux paste 3. The core 1 passes out through a die 17 of sufficient diameter to give the desired thickness to the coating of flux adhering to the core or wire 1. The core, with its flux coating 3, then passes with the strap 2ª, first through the preshaping die 18 and then through the finishing die 19. These dies are of any suitable form and may be held in any satisfactory manner. Any convenient means of lubrication for the dies may be provided where necessary as by passing the strap 2ª over a wiper or through a bath of soapsuds, graphite mixture or oil.

It is frequently desirable to introduce certain materials into the weld in order to impart given characteristics to the deposited metal. My electrode enables this to be readily accomplished, since a sheath of any desired composition may be placed on a core of any other desired composition. My electrode thus permits of the use of two different kinds of metal or electrode material within the same electrode, producing a composite electrode having characteristics which may be difficult to obtain from a single quality of metal.

While I have described a particular embodiment of my invention, and certain apparatus for carrying out my method, it will be obvious to those skilled in the art that various modifications may be made without departing from the spirit of my invention and I therefore desire to cover all such modifications as fall within the scope of my invention which is set forth in the appended claims.

What I claim as new and desire to secure by Letters Patent of the United States, is,—

1. A bare electrode for arc welding comprising a metallic core, a metal sheath, and a flux including materials having arc sustaining properties included and firmly held between the sheath and core.

2. A bare electrode for arc welding, comprising a metallic core, a metal sheath folded around said core and a welding flux including materials having arc sustaining properties included and firmly held between said sheath and core.

3. A bare electrode comprising a metallic core, a flux including materials having arc sustaining properties and of substantially uniform thickness surrounding said core and a metallic sheath surrounding and enclosing and holding said flux firmly between said sheath and core.

4. A bare electrode for metallic arc welding, comprising a core, a sheath and a welding flux including materials having arc sustaining properties enclosed and firmly held between said sheath and core, said sheath and core being composed of metals of different composition.

5. A bare electrode for metallic arc welding comprising a metallic core element, a welding flux including materials having arc sustaining properties and of substantially uniform thickness surrounding said core and a metallic sheath element surrounding said flux and firmly holding the flux between the sheath and core, one of said elements containing material to be introduced into the weld to modify or control the characteristics of the weld.

6. A bare electrode for metallic arc welding, comprising a core, a sheath folded around said core, a flux including materials having arc sustaining properties included and firmly held between said sheath and core, said sheath being constructed and arranged to provide a crevice to permit the electrode to be readily dried out.

7. A bare electrode for arc welding comprising a metallic core, a metal sheath provided with abutting edges surrounding said core and a thin layer of arc sustaining material enclosed and firmly held between said sheath and core.

8. A bare electrode of the class described comprising a metal sheath in tubular form having a crevice with closely abutting edges and a filling including materials having arc sustaining properties, said filling being enclosed by the sheath and the sheath being tightly folded down upon the filling to hold the same firmly in place.

9. The method of making an electrode which comprises passing a metallic core through a bath of flux in adherent paste form so as to provide a flux coating of substantially uniform thickness and folding a metallic sheath over said core so as to enclose and firmly hold said flux between the sheath and core.

10. The method of making a welding electrode which which comprises drawing a metallic sheath over a metallic core in a bath in paste form composed of materials having the properties of a welding flux and a die lubricant.

11. The method of making a welding electrode which comprises drawing a metallic strap over a metallic core to form a sheath thereon, while maintaining the drawing die submerged in a bath in paste form composed of materials having the properties of a welding flux and a die lubricant.

12. The method of making an electrode comprising a sheath and material enclosed within the sheath, which comprises folding a strap into tubular form while maintaining the folding die submerged in a bath in paste form of the material to be enclosed within the sheath.

13. The method of making an electrode comprising a sheath and material enclosed within the sheath, which comprises folding a strap into a closed tube provided with a seam having abutting edges while maintaining the folding mechanism submerged in a bath in paste form of the material to be enclosed within the sheath.

In witness whereof, I have hereunto set my hand this 22nd day of May, 1920.

JAMES M. WEED.